(12) United States Patent
Lin

(10) Patent No.: US 6,705,191 B2
(45) Date of Patent: Mar. 16, 2004

(54) MACHINE TOOL CIRCULAR CUTTING SUPPLEMENTARY APPARATUS

(76) Inventor: Jung-Hua Lin, No. 48, Lane 493, Sec. 3, Chung Shan Rd., Tan Tsu Country, Taichung-Hsien (TW)

( * ) Notice: Subject to any disclaimer, the term of this patent is extended or adjusted under 35 U.S.C. 154(b) by 159 days.

(21) Appl. No.: 09/987,622

(22) Filed: Nov. 15, 2001

(65) Prior Publication Data

US 2003/0089211 A1 May 15, 2003

(51) Int. Cl.⁷ .................................................. B26D 7/01
(52) U.S. Cl. ........................ 83/410.9; 83/445; 83/466; 269/58; 269/60
(58) Field of Search .................... 83/466, 445, 733, 83/410.9, 101; 409/165, 123, 112, 228; 269/58, 60

(56) References Cited

U.S. PATENT DOCUMENTS

| | | | | |
|---|---|---|---|---|
| 63,658 A | * | 4/1867 | Shumard et al. | 83/409 |
| 126,357 A | * | 4/1872 | Waterman et al. | 83/445 |
| 523,389 A | * | 7/1894 | Walter | 83/410.9 |
| 1,122,598 A | * | 12/1914 | Holub | 83/410.9 |
| 1,639,039 A | * | 8/1927 | Knabusch et al. | 83/410.9 |
| 1,907,664 A | * | 5/1933 | Preston et al. | 72/72 |
| 3,218,208 A | * | 11/1965 | Molin | 156/116 |
| 4,436,010 A | * | 3/1984 | Valentine | 83/171 |
| 5,231,905 A | * | 8/1993 | Trahan | 83/439 |
| 5,261,304 A | * | 11/1993 | Stollenwerk et al. | 83/410.8 |
| 5,575,971 A | * | 11/1996 | Bond | 266/66 |
| 6,269,724 B1 | * | 8/2001 | Sabatelli et al. | 83/813 |

* cited by examiner

*Primary Examiner*—Allan N. Shoap
*Assistant Examiner*—John Windmuller
(74) *Attorney, Agent, or Firm*—Browdy and Neimark, P.L.L.C.

(57) ABSTRACT

A machine tool circular cutting supplementary apparatus comprises an upright support vertically slidably and horizontally rotatably mounted in the worktable of a machine tool, a locating block fastened to the top of the upright support, a horizontal rod slidably inserted through a transverse through hole in the locating block and locked with a lock apparatus, and a positioning member mounted on one end of the horizontal rod member and provided with a tip being engaged with the center of the circle drawn on the workpiece to be cut by the machine tool.

7 Claims, 2 Drawing Sheets

MACHINE TOOL CIRCULAR CUTTING SUPPLEMENTARY APPARATUS

FIELD OF THE INVENTION

The present invention relates generally to a machine tool and, more specifically, to a circular cutting supplementary apparatus for use in a machine tool.

BACKGROUND OF THE INVENTION

When operating a machine tool (belt saw or band saw) to cut the workpiece into a circular shape, the operator must draw a circle on the workpiece, and then move the workpiece relative to the saw blade for enabling the workpiece to be cut along the circle. Since the workpiece is usually held by operator's hand, it is difficult to obtain a perfect circular workpiece such that, a secondary processing procedure is needed to trim the circular periphery of the finished product.

SUMMARY OF THE INVENTION

It is the primary object of the present invention to provide a machine tool circular cutting supplementary apparatus, which helps the machine tool operator to cut the workpiece accurately and efficiently along the circle drawn on the workpiece.

According to a preferred embodiment of the present invention, the machine tool circular cutting supplementary apparatus comprises an upright support vertically slidably and horizontally rotatably mounted in the worktable of a machine tool, a locating block fastened to the top of the upright support and having a transverse through hole, a horizontal rod slidably inserted through said through hole of the locating block and locked with lock means, and a positioning member mounted on one end of the horizontal rod and provided with a tip being engaged with the center of the circle drawn on the workpiece to be cut by the machine tool.

DETAILED DESCRIPTION OF THE INVENTION

Figure 1:
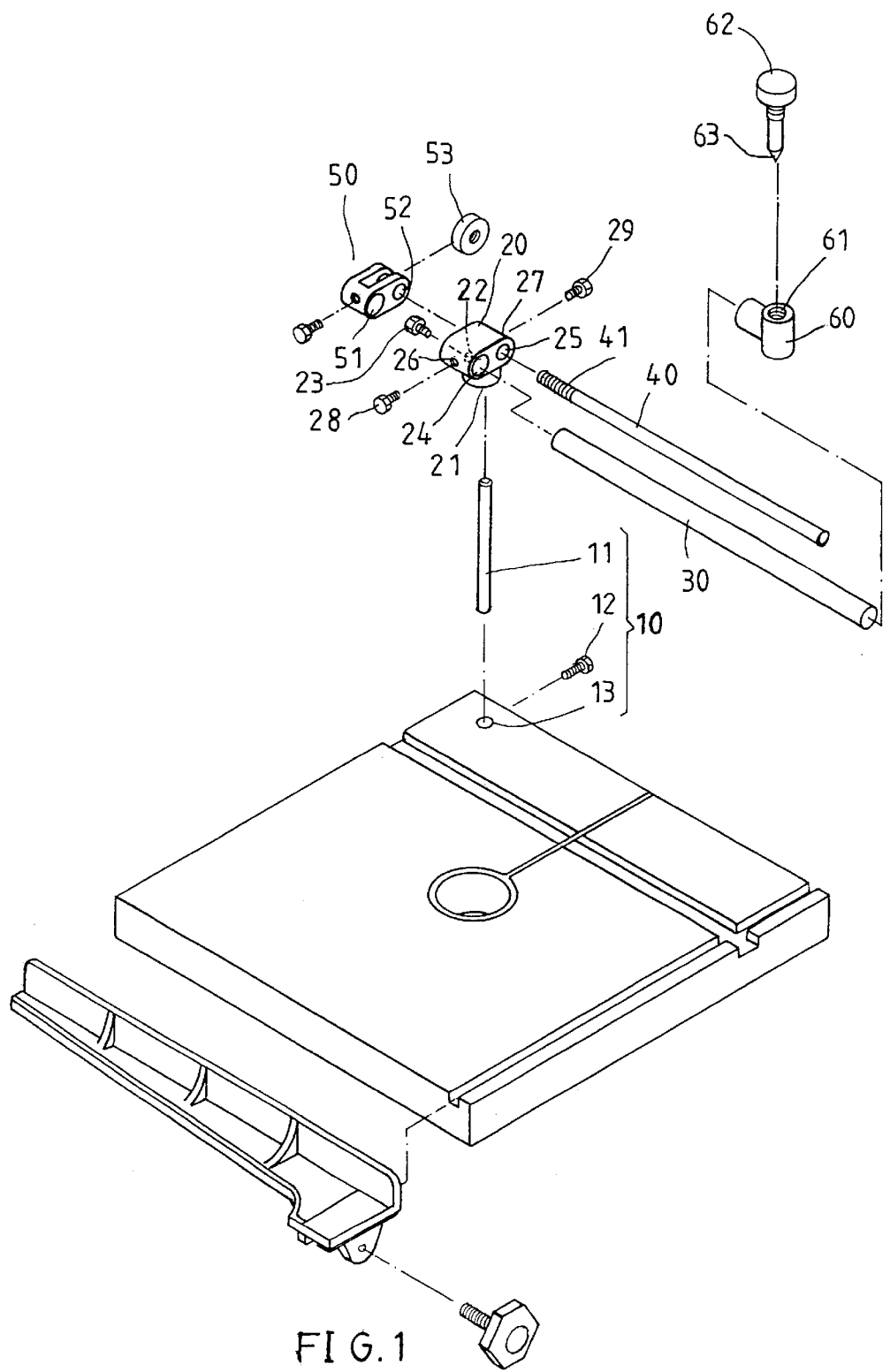
FIG. 1 is an exploded view of a circular cutting supplementary apparatus according to a preferred embodiment of the present invention.

Referring to FIG. 1, a circular cutting supplementary apparatus of a preferred embodiment of the present invention is installed in the worktable of a machine tool such as a belt saw or band saw. The apparatus comprises an adjustment unit 10, a locating block 20, a horizontal rod 30, an adjustment rod 40, a fine-adjustment member 50, and a positioning member 60.

The adjustment unit 10 provides an elevation adjustment function as well as a 360° horizontal position adjustment function, comprising an upright support 11 pivoted to the worktable of the machine tool and a locking member 12 adapted to lock the upright support 11 in position. According to the present preferred embodiment, the upright support 11 is inserted through a vertical through hole 13 in the worktable of the machine tool, and can be moved vertically in the vertical through hole 13 to the desired elevation and rotated horizontally to the desired angle. According to the present preferred embodiment, the locking member 12 is a tightening up screw threaded into a side screw hole (not shown in the FIGS.) in the worktable of the machine tool and perpendicularly stopped against the periphery of the upright support 11 in the vertical through hole 13 to tighten up the upright support 11.

The locating block 20 comprises a vertically extended bottom plug hole 21, which receives the top end of the upright support 11, a first side screw hole 22 perpendicularly extended from the bottom plug hole 21 to the front sidewall thereof, a first tightening up screw 23 threaded into the first side screw hole 22 and stopped against the periphery of the upright support 11 to fixedly secure the locating block 20 to the upright support 11, a first transverse through hole 24 and a second transverse through hole 25 horizontally extended through the front and rear sidewalls thereof and arranged in parallel, a second side screw hole 26 perpendicularly extended from the first transverse through hole 24 to one lateral sidewall thereof, a second side screw hole 27 perpendicularly extended from the second transverse through hole 25 to the other lateral sidewall thereof, a second tightening up screw 28 threaded into the second side screw hole 26 and adapted to fix the horizontal rod 30 in the first transverse through hole 24 in position, and a third tightening up screw 29 threaded into the third side screw hole 27 and adapted to fix the adjustment rod 40 in the second transverse through hole 25 in position.

The horizontal rod 30 is axially slidably inserted through the first transverse through hole 24 of the locating block 20, and fixedly secured in position by the second tightening up screw 28.

The adjustment rod 40 is axially slidably inserted through the second transverse through hole 25 of the locating block 20 and fixedly secured in position by the third tightening up screw 29. The adjustment rod 40 provides at one end thereof with a threaded portion 41.

The fine adjustment device 50 is provided with a receiving hole 51, which receives one end of the horizontal rod member 30, an adjustment hole 52, which receives the screw rod 41 of the adjustment rod member 40, and an adjustment nut 53 threaded onto the screw rod 41 of the adjustment rod member 30 for rotation by hand.

The positioning member 60 is fixedly fastened to one end of the horizontal rod 30 remote from the fine adjustment member 50. The positioning member 60 provides with a vertical screw hole 61 extended through the top and bottom sidewalls thereof. An anchoring member 62 is threaded into the vertical screw hole 61, having a pointed bottom tip 63 for contacting firmly to the center of the circle been drawn on the workpiece to be cut.

Figure 2:
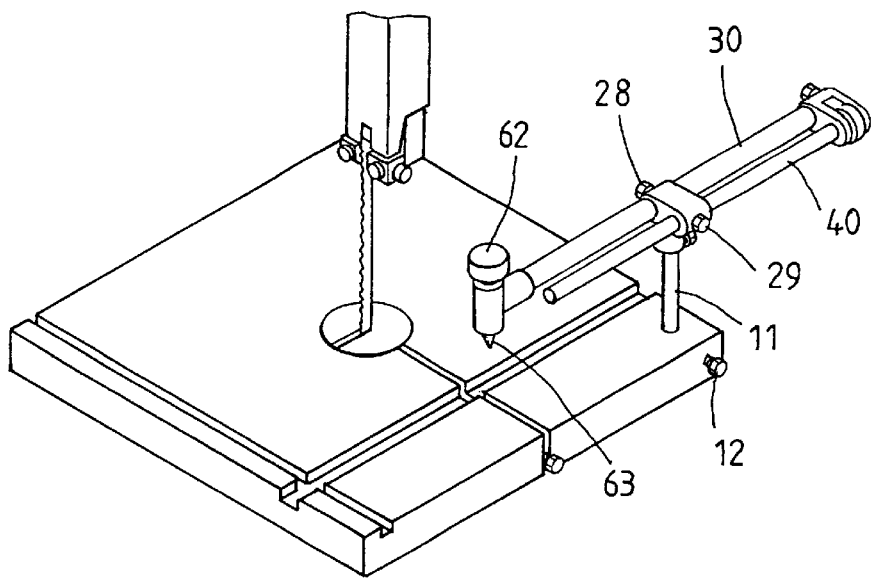
FIG. 2 shows the circular cutting supplementary apparatus installed in the machine tool according to the preferred embodiment of the present invention.
Figure 3:
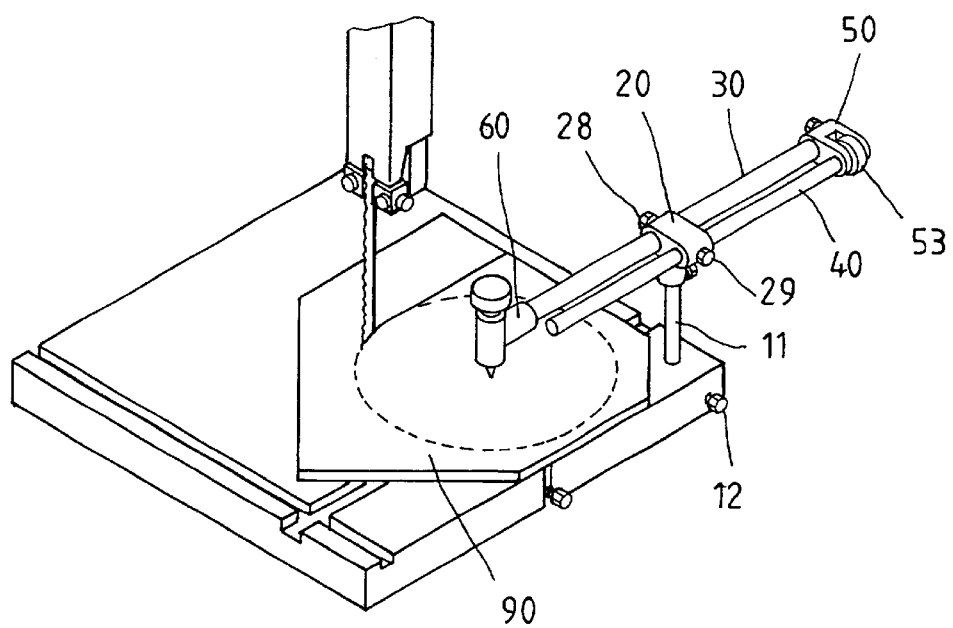
FIG. 3 shows an application example of the present invention.

The operation of the present invention is outlined hereinafter with reference to FIGS. 2 and 3. The workpiece 90 is put on the worktable of the machine tool, and the belt saw or band saw is moved to the tangent line position at the periphery of the circle (see the imaginary line shown in FIG. 3) along which the belt saw or band saw is to be moved to cut the workpiece 90, and then the locking member 12 is loosened for enabling the upright support 11 to be moved up and down in the vertical through hole 13 and rotated horizontally to adjust the locating block 20 to the desired elevation and angle, and then the locking member 12 is fastened tight to fix the upright support 11 in position. Thereafter, the second tightening up screw 28 and the third tightening up screw 29 are loosened for enabling the horizontal rod 30 and the adjustment rod 40 to be moved with the fine adjustment member 50 forwards/backwards in the transverse through holes 24, 25 of the locating block 20, and then shifting the positioning member 60 to the position where the pointed bottom tip 63 of the anchoring member 62 is aimed at the center of the circle been drawn on the workpiece 90 to be cut, and then the second tightening up screw 28 and the third tightening up screw 29 are fastened tight to fix the horizontal rod 30 and the adjustment rod 40 in position, and then the anchoring member 62 is rotated inwards in the positioning member 60 to pierce the pointed bottom tip 63 of the anchoring member 62 into the center of the been drawn on the workpiece 70 to be cut. When rotating the workpiece 90 about the pointed bottom tip 63 of the anchoring member 62 during reciprocating motion of the belt saw or band saw, the workpiece 90 is well cut along the circle drawn on it.

For fine adjustment, the second tightening up screw 28 is loosened, and then the adjustment nut 53 is rotated counterclockwise or clockwise, thereby causing the movement of the fine adjustment member 50 along the threaded portion 41 of the adjustment rod 40 forwards or backwards as well as the movement of the horizontal rod 30 forwards or backwards. After adjustment, the second tightening up screw 28 is fastened tight again.

What is claimed is:

1. A machine tool circular cutting supplementary apparatus adapted to hold a workpiece in the worktable of a machine tool for enabling said workpiece to be cut along a circle that has been drawn on said workpiece when the user rotates said workpiece relative to the machine tool circular cutting supplementary apparatus, the supplementary apparatus comprising:

an adjustment unit vertically slidably and horizontally rotatably mounted on the worktable of the machine tool and being held in position by a first locking means;

a locating block mounted on a top side of said adjustment unit, said locating block provided with a first transverse through hole and a second transverse through hole;

a horizontal rod axially slidably inserted through the first transverse through hole of said locating block and being held in position by a second locking means;

a positioning member mounted on one end of said horizontal rod, said positioning member providing with a tip adapted to engage the center of the circle drawn on said workpiece after said workpiece has been put on the worktable of the machine tool for cutting; and an adjustment rod slidably inserted through the second transverse through hole of said locating block and being held in position by a third locking means, said adjustment rod provided at one end thereof with a threaded portion.

2. The machine tool circular cutting supplementary apparatus as claimed in claim 1, wherein said positioning member is provided with a vertical screw hole extended through top and bottom sidewalls thereof, and an anchoring screw member threaded into said vertical screw hole, said anchoring screw member having said tip.

3. The machine tool circular cutting supplementary apparatus as claimed in claim 1 wherein said adjustment unit comprises an upright support pivoted in the worktable of the machine tool, said upright support having a top end fastened to said locating block.

4. A machine tool circular cutting supplementary apparatus adapted to hold a workpiece in the worktable of a machine tool for enabling said workpiece to be cut along a circle that has been drawn on said workpiece when the user rotates said workpiece relative to the machine tool circular cutting supplementary apparatus, the supplementary apparatus comprising:

an adjustment unit vertically slidably and horizontally rotatably mounted on the worktable of the machine tool and being held in position by a first locking means;

a locating block mounted on a top side of said adjustment unit, said locating block provided with a first transverse through hole and a second transverse through hole;

a horizontal rod axially slidably inserted through the first transverse through hole of said locating block and being held in position by a second locking means;

a positioning member mounted on one end of said horizontal rod, said positioning member providing with a tip adapted to engage the center of the circle drawn on said workpiece after said workpiece has been put on the worktable of the machine tool for cutting;

an adjustment rod slidably inserted through the second transverse through hole of said locating block and being held in position by a third locking means, said adjustment rod provided at one end thereof with a threaded portion; and a fine adjustment member provided with a receiving hole, which receives one end of the horizontal rod, an adjustment hole, which receives the threaded portion of the adjustment rod and an adjustment nut threaded onto the threaded portion of the adjustment rod.

5. The machine tool circular cutting supplementary apparatus as claimed in claim 4 wherein the second transverse through hole is disposed in parallel to said first transverse through hole for the positioning of said adjustment rod;

wherein said second locking means comprises a side screw hole perpendicularly extended from the first transverse through hole to one lateral sidewall of the location block and a tightening up screw threaded into the side screw hole and adapted to fix the horizontal rod in the first transverse through hole in position, and said third locking means comprises a side screw hole perpendicularly extended from the second transverse through hole to one lateral sidewall of the location block and a tightening up screw threaded into the side screw hole of said third locking means and adapted to fix the adjustment rod in the second transverse through hole in position.

6. The machine tool circular cutting supplementary apparatus as claimed in claim 4 wherein said positioning member is provided with a vertical screw hole extended through top and bottom sidewalls thereof, and an anchoring screw member threaded into said vertical screw hole, said anchoring screw member having said tip.

7. The machine tool circular cutting supplementary apparatus as claimed in claim 4 wherein said adjustment unit comprises an upright support pivoted in the worktable of the machine tool, said upright support having a top end fastened to said locating block.

* * * * *